United States Patent [19]

Hayes et al.

[11] 4,063,854

[45] Dec. 20, 1977

[54] SPRAY PUMP ASSEMBLY

[75] Inventors: Thomas H. Hayes, Baton Rouge, La.; Steve W. Beres, Bridgeport, Conn.

[73] Assignee: VCA Corporation, Baton Rouge, La.

[21] Appl. No.: 691,219

[22] Filed: June 1, 1976

[51] Int. Cl.[2] ........................ F04B 21/04; G01F 11/02

[52] U.S. Cl. .................................................... 417/552

[58] Field of Search ........................ 417/511, 550, 552; 222/321

[56] References Cited

U.S. PATENT DOCUMENTS

| | | | |
|---|---|---|---|
| 3,187,960 | 6/1965 | Gorman | 417/511 |
| 3,627,206 | 12/1971 | Boris | 417/549 |
| 3,640,470 | 2/1972 | Susuki | 222/321 |
| 3,954,354 | 5/1976 | Boris | 417/550 |

*Primary Examiner*—William L. Freeh
*Attorney, Agent, or Firm*—Donald L. Johnson; John F. Sieberth; David L. Ray

[57] ABSTRACT

A finger-operated spray pump assembly adapted to maintain a seal against leakage under substantially all conditions normally encountered by the pump. The assembly includes a compression chamber, a piston slidable in the compression chamber, a stem slidable in the piston, and a seal member abutting the piston. The lower end of the valve stem contacts the seal member to open the seal slightly before the piston starts its downstroke. A closure member for the container to be used is permanently attached to the spray pump.

1 Claim, 7 Drawing Figures

SPRAY PUMP ASSEMBLY

BACKGROUND OF THE INVENTION

This invention relates to liquid atomizer pumps. In particular, this invention relates to small hand-held, finger-operated dispensers involving pump assemblages as distinguished from pressurized aerosol containers and valves.

Hand-held atomizer pumps are known in the art, e.g., see U.S. Pat. No. 3,159,316. Among the features that are desirable in a hand-held atomizer pump are that the pump be easily primed, that it provide a leak resistant assembly when attached to a container, particularly when the container is subjected to pressure or is stored on its side or inverted. Further, it is desirable to utilize as few parts as possible in the construction of the pump and to keep the parts relatively simple to achieve low cost for the production and assembly of the pump. Another desirable feature is that the pump be permanently attached to the closure member, i.e., cap or ferrule by the pump manufacturer before shipping the pump to the customer. While some of the prior art pumps may possess some of the desirable features set forth above, no one pump is known to possess all of these features. Thus, it can be readily seen that there is a real need for an improved finger-operated spray pump.

SUMMARY OF THE INVENTION

In accordance with the present invention there is provided a liquid atomizer pump including a compression chamber, a piston slidably located in the compression chamber, a stem slidable in the piston, a seal adapted to abut the piston, and a check valve located in the lower end of the cylinder.

DESCRIPTION OF THE PREFERRED EMBODIMENTS

Figure 1:
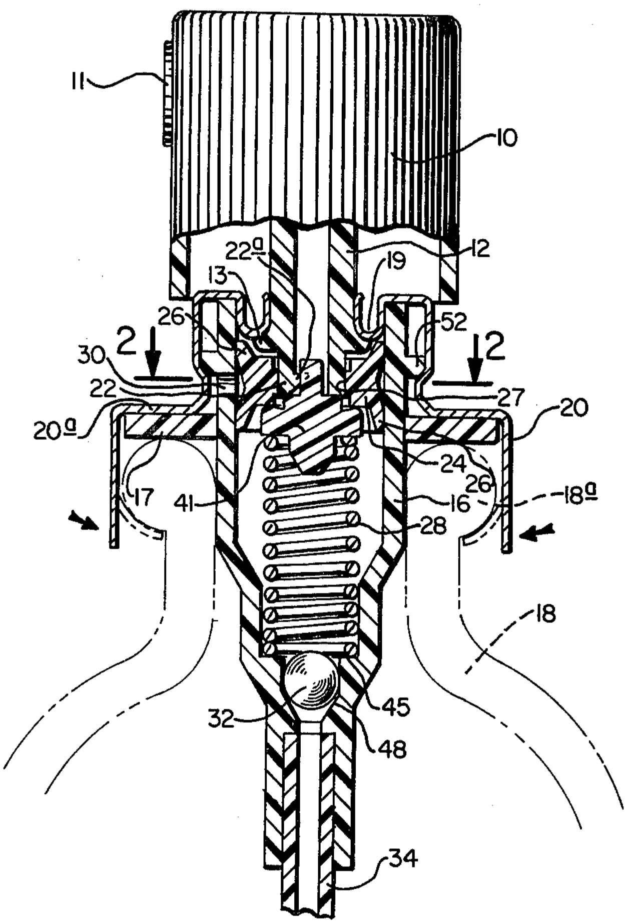
FIG. 1 is a fragmentary sectional view showing details of the pump.

The atomizer pump of the invention is illustrated in FIGS. 1 thru 7 and includes a compression chamber 16 which has an integral external flange 17 thereon which rests on top of the lip 18*a* of container 18. A cap or ferrule 20 is affixed to the top of flange 17 by crimping around the lip 18*a* of container 18 as seen in dotted outline of FIG. 1. An integral annular collar 52 on the tank permits the ferrule to be crimped thereunder to assemble the pump.

Figure 2:
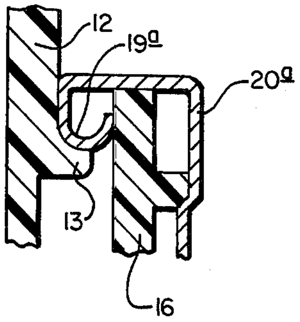
FIG. 2 is a fragmentary sectional view of another embodiment of the pump.

Slidably located inside compression chamber 16 is hollow stem 12. At the top of stem 12 is a conventional spray button actuator 10 which includes nozzle 11 for atomizing the liquid pumped from the container 18. The downward movement of stem 12 is limited by the bottom of button 10 striking the top 20*a* of cap 20. Stem 12 has an exterior shoulder 13 which contacts a U-shaped retaining ring 19 formed at the upper end of cap 20. Retaining ring 19 thus limits the upward movement of stem 12. If desired, the retaining ring can be constructed by rolling under the end of cap 20*a* to form the retaining ring 19*a* as shown in FIG. 2.

Figure 3:
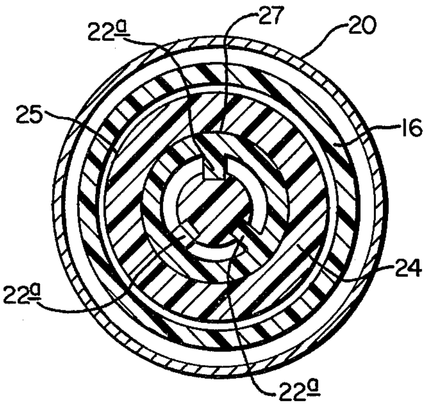
FIG. 3 is a sectional view taken along lines 2—2 of FIG. 1.

The lower end 22 of stem 12 has a reduced diameter portion which forms guides 22*a* which can be seen in FIG. 1 and in cross-section in FIG. 3. Immediately above guides 22*a* is shoulder 13 which is normally spaced from, but makes contact with, piston 24 when stem 12 is forced downwardly.

Piston 24 is slidably positioned inside compression chamber 16. As can be seen in FIG. 3, piston 24 is circular in cross-section having a central annular, reduced diameter section 25. Above and below the reduced section 25 are annular increased diameter sections 26—26 which contact the inner walls of cylinder 16 to insure a sliding pressure seal therewith. The center of piston 24 has a hollow bore 27 for sliding receipt of the lower end 22 of stem 12. The relative diameters of the lower portion 22 of stem 12 and bore 27 of piston 24 is such that the lower portion 22 of stem 12 will slide inside of piston 24 while snuggly fitting therein.

Located opposite piston 24 in FIG. 1 is vent hole 30 located in the wall of compression chamber 16. Vent hole 30 allows air from outside container 18 to enter the container when button 10 is depressed as described hereinbefore.

Figure 4:
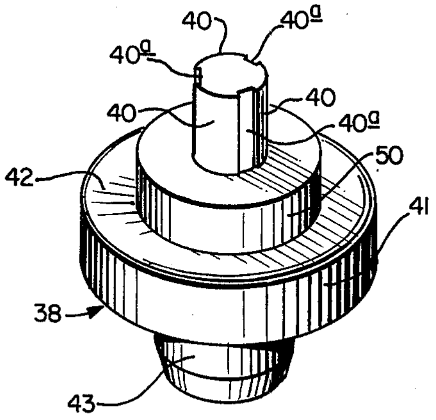
FIG. 4 is a perspective view of the seal of the pump embodiment of FIG. 1.

Slidingly fitted in the lower end of stem 12 is a seal member generally indicated by the numeral 38 in FIG. 4. Seal 38 includes a middle or base portion 41 which is circular in cross-section and has an upper surface 42 which contacts the bottom of piston 24 to make a pressure seal therewith. Located above middle portion 41 and connected thereto is intermediate portion 50 which has an annular top surface 51 thereon which rests against the bottom of stem 12. At the bottom of seal 38 is a reduced diameter cylindrical section 43 adapted to receive the upper end of coil spring 28. A top center post generally indicated by the numeral 39, projects upwardly from portion 50 and has a series of spaced apart longitudinal projections 40 thereon which form slots 40*a*. Slots 40*a* slidably receive guides 22*a* on the lower end of stem 12 to prevent seal 38 from turning relative to stem 12. In the drawings three projections are shown although a greater or lesser number may be used.

The upper end of coil spring 28 is received on the lower section 43 of seal 38 and presses against the bottom of middle section 41 as can be seen in FIG. 1. The other end of spring 28 presses against the shoulder 45 located at the lower end of the inside of cylinder 16. Beneath the bottom end of spring 28 is a hollow portion 48 for the receipt of ball check valve 32. The upward movement check valve 32 is limited by the lower end of spring 28.

Located below check valve 32 is dip tube 34 which is connected to the lower end of compression chamber 16. Tube 34 conveys liquids from container 18 to compression chamber 16.

Figure 5:
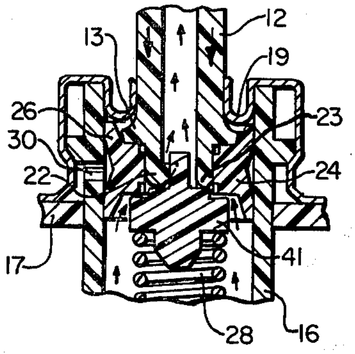
FIG. 5 is a fragmentary sectional view of the pump showing the position of the seal as the actuator button begins moving downwardly.
Figure 6:
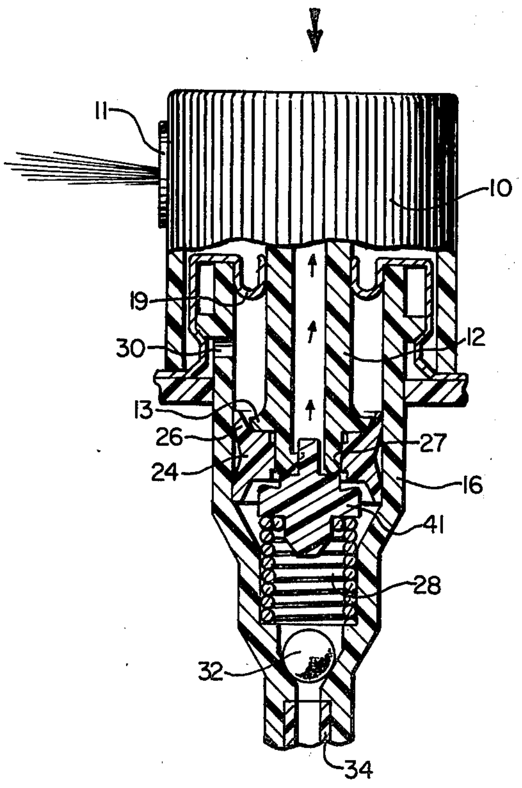
FIG. 6 is a fragmentary partly-sectional view of the pump showing the actuator button in the fully depressed position; and, FIG. 7 is a fragmentary partly-sectional view of the pump when the actuator button has begun its upward movement.
Figure 7:
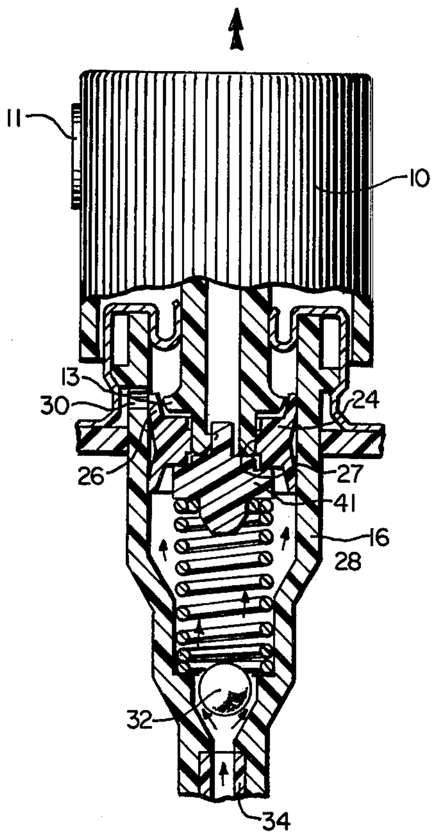

The operation of the atomizer of the present invention is shown in FIGS. 5 thru 7. As a downward force is applied to actuator 10, stem 12 is forced downwardly an initial distance forcing shoulder 23 to strike the top portion of piston 24 and forcing the face 41 of seal 38 away from the bottom of piston 24. At this point fluid contained beneath piston 24 begins to move upwardly in the direction indicated by the arrows in FIG. 5 around seal 38 and upward through stem 12 to nozzle 11. At the position shown in FIG. 5, piston 24 has not been forced downward any distance by stem 12.

In FIG. 6, stem 12 has been forced downward to fully compress spring 28. Valve 32 has been closed during the full downward movement of stem 12 due to the pressure on the fluid between piston 24 and valve 22, and fluid has continued to flow as shown by the arrows in FIG. 5. During such time that the depressing movement of the piston assemblage occurs, venting is effected, by which air is permitted to enter the container 18 from the exterior of the atomizer in order to replace the liquid which is being discharged. Such venting action invloves the vent hole 30 in the side of the compression chamber 16, the piston 24, and the loose fit of stem 12 in the stem guide section 19 of the ferrule.

It will be observed in FIG. 6 that piston 24 has been shifted downward to a level below the vent hole 30. In consequence, such vent hole will now have communication with the exterior atmosphere, by virtue of the looseness of the fit between the stem portion 12 and interior of the compression chamber 16, as well as the looseness of the fit between the stem portion 12 and grommet 14. Atmospheric air may enter past such loose fitting parts, into the upper portion of the compression chamber 16 and thence outward through the vent hole 30 to the interior of the container 18.

In FIG. 7 the atomizer pump is shown after the downward force on actuator 10 has been released and the piston and stem are traveling upward. At this point, spring 28 forces stem 12 upward and liquid from tank 18 travels upwardly in tube 34. The liquid forces check valve 32 up, flows therearound, and continues upward through spring 28 into the space beneath piston 24. As soon as the downward force on actuator button 10 is released, spring 28 forces the surface 42 of seal 38 into contact with the bottom of piston 24 thereby preventing any air from entering the inside of compression chamber 16 below the piston. After stem 12 has traveled completely upward, the volume beneath piston 24 and above valve 32 will be filled with liquid. Piston 24 will be opposite vent hole 30 and upper piston surface 26 will be in sealing contact with retaining ring 19, thus blocking the contents of container 18 and preventing any liquid from seeping or leaking past the loose fitting stem 12. Thus, when button 10 is again depressed the fluid within compression chamber 16 will be forced outward through nozzle 11.

What is claimed is:

1. A finger-operated spray pump assembly comprising:
   a. compression chamber means having vent hole means in the wall thereof and dip tube means connectable at the lower end thereof;
   b. closure means rigidly connectable to said compression chamber means;
   c. piston means slidably fitted in said compression chamber means;
   d. check valve means located in the lower end of said compression chamber means;
   e. hollow stem means having an upper end and a lower end, said upper end of said stem means being slidably fitted inside said closure means and said lower end of said stem means being slidably fitted in said piston means, said stem means having actuator button means connectable to the upper end thereof, said stem means having shoulder means for contacting and forcing said piston means towards said check valve means;
   f. seal means slidably fitted in the lower end of said stem means, the lower end of said stem means being adapted to urge said seal means away from sealing contact with said piston means prior to said shoulder means contacting said piston means, said seal means having base means for making sealing contact with said piston means, said base means having post means connected thereto, said post means being adapted for slidable receipt within the lower end of said stem means, said post means having projection means thereon which define slot means therebetween, said slot means being adapted to slidably receive guide means located on the inside of the lower end of said stem means to prevent said seal means from turning relative to said stem means; and,
   g. spring means fitted inside said compression chamber means to urge said seal means against said piston means.

* * * * *